US007151743B2

(12) United States Patent
Wahl et al.

(10) Patent No.: US 7,151,743 B2
(45) Date of Patent: Dec. 19, 2006

(54) METHOD OF TRANSMITTING A DATA PACKET

(75) Inventors: Stefan Wahl, Schwieberdingen (DE); Wolfram Seibold, Remshalden (DE)

(73) Assignee: Alcatel, Paris (FR)

( * ) Notice: Subject to any disclaimer, the term of this patent is extended or adjusted under 35 U.S.C. 154(b) by 836 days.

(21) Appl. No.: 09/944,174

(22) Filed: Sep. 4, 2001

(65) Prior Publication Data
US 2002/0027895 A1 Mar. 7, 2002

(30) Foreign Application Priority Data
Sep. 5, 2000 (DE) ............................... 100 43 658

(51) Int. Cl.
*H04J 3/14* (2006.01)
*H04J 3/06* (2006.01)
*H04L 12/26* (2006.01)

(52) U.S. Cl. ....................... 370/229; 370/516
(58) Field of Classification Search ............... 370/394, 370/486–490, 346–349, 449–463, 229–230.1, 370/503, 516
See application file for complete search history.

(56) References Cited

U.S. PATENT DOCUMENTS

| | | | | |
|---|---|---|---|---|
| 4,498,169 A | * | 2/1985 | Rozmus ...................... 370/432 |
| 5,577,043 A | * | 11/1996 | Guo et al. ................... 370/449 |
| 5,745,769 A | * | 4/1998 | Choi ........................... 710/220 |
| 5,815,660 A | * | 9/1998 | Momona ..................... 709/208 |
| 5,818,845 A | * | 10/1998 | Moura et al. ................ 370/449 |
| 5,894,472 A | | 4/1999 | de Seze |
| 5,926,476 A | * | 7/1999 | Ghaibeh ................. 370/395.65 |
| 5,963,557 A | * | 10/1999 | Eng ............................. 370/432 |
| 5,970,063 A | * | 10/1999 | Chapman et al. ........... 370/346 |
| 6,370,153 B1 | * | 4/2002 | Eng ............................. 370/438 |
| 6,526,030 B1 | * | 2/2003 | Rezaiifar et al. ........... 370/335 |
| 6,744,780 B1 | * | 6/2004 | Gu et al. ..................... 370/450 |

FOREIGN PATENT DOCUMENTS

DE     695 08 595 T2     11/1995
DE    6965 08 595 T2     10/1999

(Continued)

OTHER PUBLICATIONS

Quigley TJ: "Cable modem standards for advanced quality of service deployments" Consumer electronics, 1999. ICCE. International Conference on Los Angeles, CA, USA Jun. 22-24, 1999, Piscataway, NJ, USA, IEEE, US, Jun. 22, 1999, pp. 282-283, XP010346563.

(Continued)

*Primary Examiner*—Kevin C. Harper
(74) *Attorney, Agent, or Firm*—Sughrue Mion, PLLC

(57) ABSTRACT

In a multiple access system, transmit authorizations are transmitted at a high rate in order to fulfil the requirements relating to the delay jitter. However, the transmit authorizations are transmitted only as long as is necessary. Following the reception of a data packet of a terminal, the transmission of further transmit authorizations for the same terminal is interrupted. Only after a specific time period, i.e. shortly before the expected transmission of a data packet of the same terminal, are transmit authorizations again sent to this terminal at a high data rate. In this way short time periods, in which transmit authorizations are sent to a terminal at a high rate, alternate with long time periods in which no transmit authorizations are sent to this terminal. In the long time periods, for example, transmit authorizations can be sent consecutively, in each case in short time periods, to one, two or more further terminals. In this way the bandwidth utilization is optimised.

14 Claims, 1 Drawing Sheet

FOREIGN PATENT DOCUMENTS

EP      0 444 207 A1    9/1991
EP      0 702 470 A1    3/1996

OTHER PUBLICATIONS

Ho W W et al: "A multiple-partition token ring network" Multiple Facets of Integration. San Francisco, Jun. 3-7, 1990, Proceedings of the Annual Joint Conference of the Computer and Communications societies (INFOCOM), Washington, IEEE Comp. Soc. Press, US, Bd. 2 Conf. 9, Jun. 3, 1990, pp. 982-988, XP0110019485.

Glen Slater Motorola Inc.. "Media Access Control Protocol Based on DOCSIS 1.1" IEEE 802.16 Broadband Wireless Access Working Group, Oct. 29, 1999, pp. 0-12, XP002248637.

Mukherjee B et al: "Partitioning a token ring network for performance advantage" Local Computer Networks, 1988, Proceedings of the 13th Conference on Minneapolis, MN, USA, Oct. 10-12, 1988, Washington DC, USA, IEEE Comput. Soc. PR, US, Oct. 10, 1988, pp. 386-394, XP010014504.

\* cited by examiner

METHOD OF TRANSMITTING A DATA PACKET

TECHNICAL FIELD

The invention relates to a method of transmitting a data packet from a first transmitting/receiving device to a second transmitting/receiving device. The invention is based on a priority application DE 100 43 658.7 which is hereby incorporated by reference.

BACKGROUND OF THE INVENTION

Data packets are transmitted for example in multiple access systems. A multiple access system has the form for example of a point-to-multipoint system, for example a HFC-system, HFR-system, LMDS-system, UMTS-system or hyperLAN-system; HFC=Hybrid Fibre Coax, HFR=Hybrid Fibre Radio, LMDS=Local Multipoint Distribution System, UMTS=Universal Mobile Telecommunications System.

In multiple access systems, in particular delay-sensitive, low-bandwidth services generate only small bandwidths on the path from the terminals to the control centre. Such services are for example VoIP, request signals for web pages, request signals for SoD or the like; VoIP=Voice over Internet Protocol=telephony via the internet, SoD=Service on Demand=services such as videos, tutorial programs, music on request. The required bandwidths for the use of a service are distinctly below 64 kbit/s. At the same time however, stringent demands are made on the maximum delay jitter, for example in the order of magnitude of 1 to 4 ms.

Prior to each transmission of data packets from the terminals to the control centre, transmit authorizations, for example allocations of time slots, time intervals, codes, frequency channels or arbitrary combinations thereof, are transmitted from the control centre to the terminals. Only after the reception of a transmit authorization is a terminal allowed to transmit a data packet. The access method for the terminals is for example TDMA, CDMA, FDMA or any combination thereof, e.g. TFDMA; TDMA=Time Division Multiple Access, CDMA=Code Division Multiple Access, FDMA=Frequency Division Multiple Access, TFDMA=Time and Frequency Division Multiple Access.

If transmit authorizations are sent to a terminal at a low rate, for example a rate which corresponds to the traffic volume of a VoIP application, the time intervals between the individual transmit authorizations and the resultant delay jitter are very large. The delay jitter is for example greater than 10 ms and thus exceeds the permissible maximum.

To fulfill the delay jitter requirement, the rate of the transmit authorizations for each terminal is increased. However, the increased transmit authorization rate inevitably leads to a bandwidth provision which greatly exceeds the bandwidth of the expected traffic volume. In this way a large part of the bandwidth made available remains unused and therefore is wasted. Especially in radio systems in which little bandwidth is available, this has a disadvantageous effect, for example it distinctly limits the number of radio stations in a cell wishing to transmit data packets simultaneously.

SUMMARY OF THE INVENTION

The object of the invention is to provide a method of transmitting a data packet which fulfils the delay jitter requirements and at the same time is optimised in respect of the bandwidth utilization.

This object is achieved by a first method of transmitting a data packet from a first transmitting/receiving device to a second transmitting/ receiving device, comprising the following steps:
 a) transmission of at least two transmit authorizations from the second transmitting/receiving device to the first transmitting/receiving device;
 b) transmission of the data packet from the first transmitting/receiving device to the second transmitting/receiving device following the reception of transmit authorizations
 c) interruption of the transmission of transmit authorizations from the second transmitting/receiving device to the first transmitting/receiving device following the reception of the data packet.

The object of the invention is further achieved by a second method for sending transmit authorizations from a first transmitting/receiving device to a second transmitting/receiving device, wherein the transmit authorizations are sent to the second transmitting/receiving device in a first time period and wherein the first time period is shorter than a second time period which adjoins the first time period and in which no transmit authorizations are sent to the second transmitting/receiving device. The object of the invention is further achieved by a control centre for a multiple access system comprising a control unit for the controlled transmission of transmit authorizations to transmitting/receiving devices, wherein the control unit is capable of sending at least two transmit authorizations to a transmitting/receiving device an of interrupting the transmission of the transmit authorizations to the one transmitting/receiving device as soon as the control centre has received a data packet from the one transmitting/receiving device.

In the first method according to the invention, transmit authorizations are transmitted at a high rate in order to fulfil the requirements in respect of the delay jitter. However the transmit authorizations are only transmitted as long as is necessary. Following the reception of a data packet of a terminal, the transmission of further transmit authorizations for the same terminal is interrupted. Only after a specified time period, i.e. shortly before the expected transmission of a data packet of the same terminal, are transmit authorizations again sent to this terminal at a high data rate. In this way short time periods, in which transmit authorizations are sent at a high rate to a terminal, alternate with long time periods in which no transmit authorizations are sent to this terminal. In the long time periods for example transmit authorizations can be sent consecutively, in each case in short time periods, to one, two or more further terminals. The first method according to the invention can thus be referred to as a method of transmitting a data packet from a first transmitting/receiving device to a second transmitting/ receiving device, comprising the following steps:
 a) transmission of at least two transmit authorizations from the second transmitting/receiving device to the first transmitting/receiving device;
 b) transmission of the data packet from the first transmitting/receiving device to the second transmitting/receiving device following the reception of transmit authorizations;
 c) interruption of the transmission of transmit authorizations from the second transmitting/receiving device to the first transmitting/receiving device following the reception of the data packet.

The first transmitting/receiving device has the form for example of a terminal, cable modem or radio station of a multiple access system. The second transmitting/receiving device has the form for example of a control centre, head end or hub of a HFC- or HFR system, a control centre of a hyperLAN-system or a base station of a LMDS- or UMTS-system. The multiple access system is for example a point-to-multipoint system with a control centre and a plurality of terminals. The second transmitting/receiving device forms the control centre, while the first transmitting/receiving device forms a terminal. The access method for the terminals to the transmission channel to the control centre is centrally controlled. In the case of TDMA, the control centre confers transmit authorizations by allocating time slots in which a specified terminal is authorized to transmit. The central allocation serves to prevent collisions. The transmit authorizations and the data packets sent by the terminals are not synchronised with one another. The data packets of the terminals have a low data rate and upon their transmission a certain delay occurs which is different for different terminals due to the different distances between the terminals and the control centre. To fulfil delay jitter requirements, the transmit authorizations are transmitted at a high rate. Only after the reception of at least two transmit authorizations can each terminal effect a controlled transmission of a data packet such that the delay jitter requirement is fulfilled. From the received transmit authorizations, each terminal derives the items of information necessary for the purposive transmission of a data packet at a specific time. When a data packet from a terminal has arrived at the control centre, due to the fact that each terminal uses only a low data rate for the transmission of data packets, it is ensured that no further data packets are to be expected from the same terminal in a specific time period. The transmission of transmit authorizations for this terminal is thus interrupted as soon as a data packet has been received from the terminal.

Only when, after a specific time period which can be determined from the data rate of a terminal, a further data packet is expected, is the transmission of transmit authorizations for this terminal continued. In this way at least two transmit authorizations are sent from the second transmitting/receiving device, i.e. the control centre, to the first transmitting/receiving device i.e. a terminal, when a further data packet is expected from this terminal. Additionally, the transmission of the transmit authorizations from the second transmitting/receiving device to the first transmitting/receiving device is interrupted again as soon as the second transmitting/receiving device has received the further data packet.

The process of transmission of transmit authorizations and the interruption of the transmit authorizations continues for such time as the connection between control centre and terminal exists. If for example a terminal has dialled into the internet, the above process is continued until the end of the internet session.

As a result of the interruption of the transmit authorizations, time periods are generated which can be used for additional purposes. The bandwidth which is available between the transmission of data packets of a terminal can be used by other terminals for the transmission of data packets. Following the interruption of the transmission of transmit authorizations from the second transmitting/receiving device, i.e. the control centre, to the first transmitting/receiving device, i.e. a first terminal, advantageously at least two transmit authorizations are sent from the second transmitting/receiving device to a third transmitting/receiving device i.e. a second terminal. The transmission of the transmit authorizations from the second transmitting/receiving device to the third transmitting/receiving device is interrupted as soon as a data packet from the third transmitting/receiving device has been received in the second transmitting/receiving device. In this way a transmission channel of a specific bandwidth can be used simultaneously by two terminals. For this purpose the terminals transmit in time-shifted manner under the control of the control centre. As a function of the available bandwidth of a transmission channel and the data rate of the terminals, the above procedure can be extended to three, four and more terminals, in which case three, four and more terminals can simultaneously use the same transmission channel in time-shifted manner under the control of the control centre.

Therefore in general it is possible to refer to a second method of transmitting transmit authorizations from a first transmitting/receiving device, for example a control centre, to a second transmitting/receiving device, for example a terminal, wherein the transmit authorizations are sent to the second transmitting/receiving device in a first time period and wherein the first time period is shorter than a second time period which adjoins the first time period and in which no transmit authorizations are sent to the second transmitting/receiving device. The time intervals between two transmit authorizations advantageously fulfil predetermined delay jitter requirements. At least in a time slot of the second time period, transmit authorizations can be sent to a third, fourth, fifth transmitting/receiving device.

The control centre according to the invention of the multiple access system comprises a control unit, for example an access-control controller, a MAC controller (MAC=Medium Access Control), a processor, a CPU, a software program on a computing unit or the like, for the controlled transmission of transmit authorizations to transmitting/receiving devices, for example terminals. The control unit is capable of sending a transmitting/receiving device at least two transmit authorizations and of interrupting the transmission of the transmit authorizations to the one transmitting/receiving device as soon as the control centre has received a data packet of the one transmitting/receiving device. The control centre has the form for example of a head end or hub of a HFC- or HFR system, a control centre of a hyperLAN system, or a base station of a LMDS- or UMTS system. The transmitting/receiving devices each have the form of a cable modem or radio station.

BRIEF DESCRIPTION OF THE DRAWINGS

The present invention will now be described in detail by describing illustrative, non-limiting embodiments thereof with reference to the accompanying drawings.

BEST MODE FOR CARRYING OUT THE INVENTION

In the following the invention will be explained in the form of an exemplary embodiment.

In the case of a VoIP application, a terminal generates for example a data rate of 10 kbit/s. In this way data packets containing voice information are transmitted at a data rate of 10 kbit/s. For this purpose the control centre of the multiple access system must make available a transmit authorization rate of approximately one transmit authorization every 40 ms. The delay jitter is not to exceed 4 ms for example. In the multiple access system this would result in a data rate of 106 kbit/s for the VoIP application. Due to the fact that the VoIP application requires only 10 kbit/s, 96 kbit/s of the 106 kbit/s remain unused. In accordance with the invention, however, the transmission of the transmit authorizations is interrupted after the reception of a data packet for the corresponding terminal. If the VoIP data packets arrive in the control centre for example with an inaccuracy of ±4 ms, about 7 out of 9 transmit authorizations can be interrupted. The 7 potential transmit authorizations can be used for one, two or three further VoIP applications. Thus in the exemplary embodiment the bandwidth of a transmission channel made available is used simultaneously by up to four terminals for four VoIP applications. This corresponds to a four-fold increase compared to the prior art.

Figure 1:
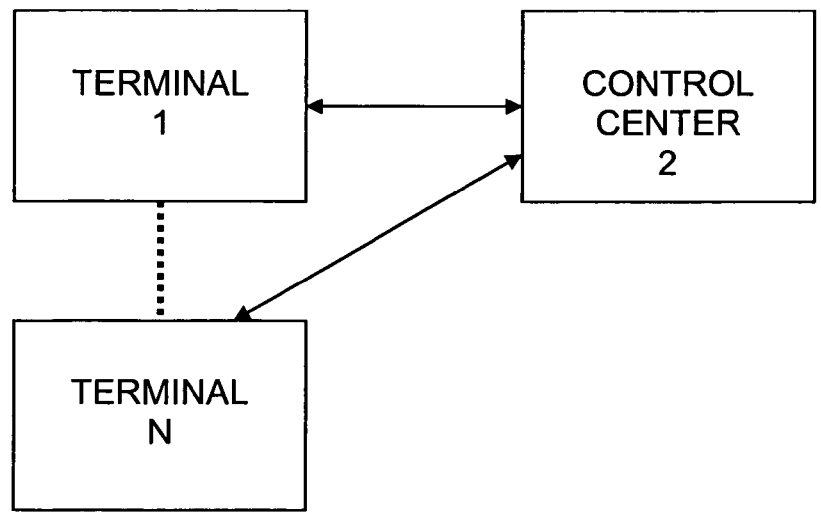
FIG. 1 is a block diagram illustrating a multiple access system according to an illustrative, non-limiting embodiment of the present invention.
Figure 2:
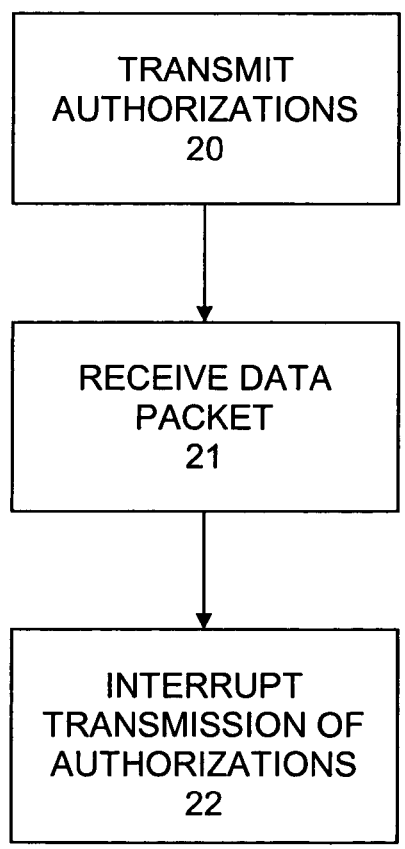
FIG. 2 is a flow chart illustrating a method of transmitting data packets from the terminal to the control center according to an illustrative, non-limiting embodiment of the present invention.

FIG. 1 illustrates an exemplary multiple access system. As depicted in FIG. 1, the system has a number of terminals 1 to N and a control center 2. FIG. 2 illustrates an exemplary method of transmitting the data packets from a terminal to the control center. In particular, at operation 20, the control center transmits authorizations to a terminal. The authorizations are transmitted when data packets are expected from the terminal. Also, the authorizations are transmitted at a high rate to meet the delay jitter requirements. Next, in operation 21, a data packet is received in the control center. Accordingly, in operation 22, the control center interrupts the transmission of authorizations. That is, in response to the receipt of the data packet from the terminal, the control center interrupts the transmission of authorizations to this data terminal.

The generation of transmit authorizations or transmit permissions thus take place at a high rate in order to fulfil the delay jitter requirements. At the same time the transmit authorizations are sent to a specific terminal only in the time periods in which data packets are expected from this terminal. As soon as a data packet of a specific terminal has been received in the control centre, the transmission of the transmit authorizations to this terminal is interrupted. The invention thus consists of an intelligent control of the transmit authorizations which are generated at a high rate in order to fulfil the delay jitter requirements. The dynamic allocation of interrupted transmit authorizations of a terminal to other terminals serves to optimise the bandwidth utilization.

The invention claimed is:

1. A method of transmitting a data packet from a first transmitting/receiving device to a second transmitting/receiving device, comprising:

transmitting at least two transmit authorizations from the second transmitting/receiving device to the first transmitting/receiving device;

transmitting the data packet from the first transmitting/receiving device to the second transmitting/receiving device following the reception of transmit authorizations; and interrupting the transmission of transmit authorizations from the second transmitting/receiving device to the first transmitting/receiving device when the data packet is received, wherein contents of the received data packet are unrelated to the interruption of the transmit authorizations, wherein time intervals between two transmit authorizations fulfill predetermined delay jitter requirements.

2. The method according to claim 1, further comprising:

sending at least two transmit authorizations from the second transmitting/receiving device to the first transmitting/receiving device when a further data packet is expected; and transmitting the transmit authorizations from the second transmitting/receiving device to the first transmitting/receiving device is interrupted again as soon as the second transmitting/receiving device has received the further data packet.

3. A method according to claim 1, further comprising:

following the interruption of the transmission of transmit authorizations from the second transmitting/receiving device to the first transmitting/receiving device, sending at least two transmit authorizations from the second transmitting/receiving device to a third transmitting/receiving device; and interrupting the transmission of the transmit authorizations from the second transmitting/receiving device to the third transmitting/receiving device as soon as a data packet from the third transmitting/receiving device has been received in the second transmitting/receiving device.

4. The method according to claim 1, wherein the second transmitting/receiving device automatically interrupts the transmission of transmit authorizations from the second transmitting/receiving device to the first transmitting/receiving device in response to receiving the data packet.

5. The method according to claim 4, wherein the second transmitting/receiving device automatically resumes the transmission of the transmit authorizations after a predetermined period of time, said transmission is resumed shortly before next data packet is expected to be sent from the first transmitting receiving device.

6. The method according to claim 1, wherein the contents of the received data packet comprise user data information or communication data information.

7. A method of transmitting a data packet from a first transmitting/receiving device to a second transmitting/receiving device, comprising:

transmitting at least two transmit authorizations from the second transmitting/receiving device to the first transmitting/receiving device;

transmitting the data packet from the first transmitting/receiving device to the second transmitting/receiving device following the reception of transmit authorizations; and interrupting the transmission of transmit authorizations from the second transmitting/receiving device to the first transmitting/receiving device when the data packet is received, wherein contents of the received data packet are unrelated to the interruption of the transmit authorizations, wherein transmit authorizations are transmitted at a high rate to fulfill predetermined delay jitter requirements and wherein the transmit authorizations are transmitted only in time periods in which data packet is expected to be transmitted from the first transmitting/receiving device.

8. A method of transmitting data packets from a first transceiver to a second transceiver and from a third transceiver to the second transceiver, the method comprising:

sending at least two send authorizations at a high send authorization rate from the second transceiver to the first transceiver, where time intervals between the at least two send authorizations satisfy preset delay jitter requirements;

sending a first data packet from the first transceiver to the second transceiver after receipt of the at least two send authorizations, where the transmission takes place at a time derived from the at least two received send authorizations and where the transmission takes place at a low data rate, the low data rate being lower than the high send authorization rate;

suspending transmission of send authorizations from the second transceiver to the first transceiver after receipt of the first data packet; and after the suspension of transmission and before a renewed transmission of at least two send authorizations from the second transceiver to the first transceiver, sending at least two send authorizations from the second transceiver to the third transceiver, where the transmission of the send authorizations from the second transceiver to the third transceiver is suspended as soon as a second data packet is received from the third transceiver in the second transceiver.

9. The method according to claim 8, wherein at least two further send authorizations are sent from the second transceiver to the first transceiver when a further data packet is expected, and wherein the transmission of the send authorizations from the second transceiver to the first transceiver is again suspended as soon as the second transceiver has received the further data packet.

10. A first transceiver for transmission of data packets to a second transceiver, comprising:
   means for receiving at least two send authorizations sent at a high send authorization rate, which are sent by the second transceiver, where time intervals between the at least two send authorizations satisfy preset delay jitter requirements; and
   after receipt of the at least two send authorizations, means for sending a first data packet to the second transceiver, where the transmission takes place at a time derived from the at least two received send authorizations,
   wherein the means for sending the first data packet executes the transmission at a low data rate, the low data rate being lower than the high send authorization rate.

11. A second transceiver for transmission of send authorizations to a first and a third transceiver and for receipt of data packets from the first and the third transceiver, comprising:
   sending module sending at least two send authorizations at a high send authorization rate to the first transceiver, where the time intervals between the at least two send authorizations satisfy preset delay jitter requirements;
   a receiving module receiving a first data packet from the first transceiver, where the data rate of the first data packet is lower than the high send authorization rate; and
   a suspension module suspending the transmission of send authorizations to the first transceiver after the receipt of the first data packet,
   wherein, after the suspension of transmission and before a renewed transmission of at least two send authorizations to the first transceiver, the second transceiver sends at least two send authorizations to the third transceiver and suspends the transmission of the send authorizations to the third transceiver as soon as the second transceiver receives a second data packet from the third transceiver.

12. The second transceiver according to claim 11, wherein the second transceiver is configured as a central station for a multiple access system, where the central station is developed as one of: a head end or hub of an HFC or HFR system, a central station of a HyperLAN system, and as a base station of an LMDS or UMTS system, and wherein the first and third transceivers are each developed as one of a cable modem and a radio station.

13. The method according to claim 1, wherein the second transmitting/receiving device is a receiver of data transmitted by the first transmitting/receiving that serves as a sender of the data and wherein the authorizations authorize the sender to transmit the data to the receiver.

14. The method according to claim 1, wherein the authorizations authorize a sender to transmit data to a device sending said authorizations.

* * * * *